United States Patent
Bangel et al.

(10) Patent No.: US 7,386,570 B2
(45) Date of Patent: Jun. 10, 2008

(54) METHOD, SYSTEM AND PROGRAM PRODUCT FOR PROVIDING HIGH PERFORMANCE DATA LOOKUP

(75) Inventors: Matthew J. Bangel, Poughkeepsie, NY (US); Scott D. Hicks, Underhill Center, VT (US); James A. Martin, Jr., Endicott, NY (US); Douglas G. Murray, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 11/095,997

(22) Filed: Mar. 31, 2005

(65) Prior Publication Data

US 2006/0224614 A1    Oct. 5, 2006

(51) Int. Cl.
    *G06F 17/30* (2006.01)
(52) U.S. Cl. .................................. 707/102; 707/101
(58) Field of Classification Search ............... 707/101, 707/102; 715/501, 511, 513
    See application file for complete search history.

(56) References Cited

U.S. PATENT DOCUMENTS

| | | | |
|---|---|---|---|
| 5,745,896 A * | 4/1998 | Vijaykumar | 707/100 |
| 6,421,686 B1 | 7/2002 | Martin, Jr. | |
| 6,435,737 B1 * | 8/2002 | Wise et al. | 712/200 |
| 6,457,029 B1 | 9/2002 | Switzer, Jr. | |
| 6,493,717 B1 * | 12/2002 | Junkin | 707/102 |
| 6,697,930 B2 * | 2/2004 | Wise et al. | 712/2 |
| 6,842,878 B1 * | 1/2005 | Johnson et al. | 715/853 |
| 2002/0046131 A1 * | 4/2002 | Boone et al. | 705/26 |
| 2002/0066007 A1 * | 5/2002 | Wise et al. | 712/300 |
| 2003/0196078 A1 * | 10/2003 | Wise et al. | 712/300 |
| 2006/0242102 A1 * | 10/2006 | Bruno et al. | 707/1 |

OTHER PUBLICATIONS

Honishi T. Satoh, et al., "An index structure for parallel database processing", (Feb. 2-3, 1992) IEEE, NTT Network Inf. System. Lab., Japan, , pp. 224-225.*
Andrei Arion et al., "Structured materialized view for XML queries", (2007, ACM, NY, NY, pp. 87-98.*

* cited by examiner

*Primary Examiner*—Diane Mizrahi
(74) *Attorney, Agent, or Firm*—Anna Linne; Hoffman, Warnick & D'Alessandro LLC

(57) ABSTRACT

Under the present invention, index keys are generated for a set of documents. This is typically accomplished by examining the set of documents, and connecting data values extracted from the set of documents to yield the index keys. Once the index keys are generated, an index view will be generated into which the index keys are populated. Using the index keys in the index view, an agent will automatically obtain the set of documents (i.e., in the background). Then, when a user requests one of the documents, the document will already have been retrieved from storage. As such, it can readily be provided to the user. It should be understood that as used herein, the term "document" is intended to refer to any type of electronically stored data.

13 Claims, 3 Drawing Sheets

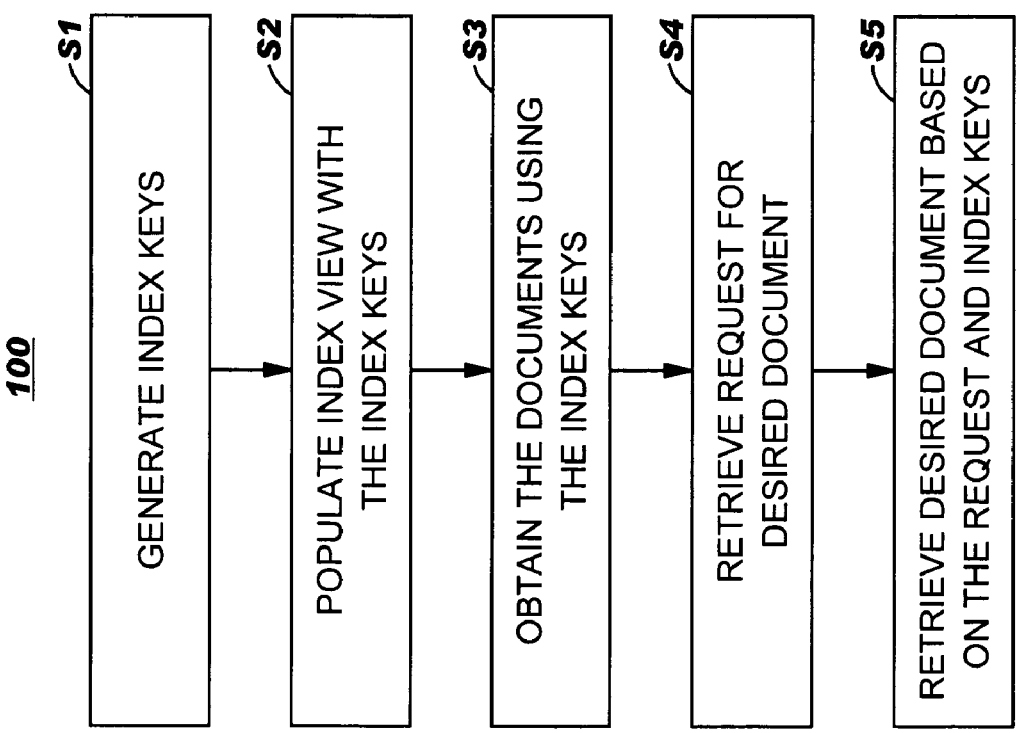

METHOD, SYSTEM AND PROGRAM PRODUCT FOR PROVIDING HIGH PERFORMANCE DATA LOOKUP

BACKGROUND OF THE INVENTION

1. Field of the Invention

The present invention generally relates to data lookup. Specifically, the present invention relates to a method, system and program product for providing high performance data lookup (e.g., document retrieval).

2. Related Art

As the use of information technology (IT) continues to increase, a growing number of organizations are turning to IT-based solutions for their data storage needs. For example, today an organization can store a countless number of "documents" electronically while consuming very little physical space. Such an IT-based approach can not only save overhead costs, but also allows for improved redundancy. Moreover, when storing documents electronically, computerized access can be provided for authorized individuals from virtually any location.

Unfortunately, electronic document storage has various drawbacks. For example, in order to provide efficient access to electronic documents, they must be indexed in some manner. Moreover, requests for documents must be handled correctly. Due to the manner in which the documents can be stored, there is often a latency involved with their retrieval.

In view of the foregoing, there exists a need for a method, system and program product for providing high performance data lookup. Specifically, a need exists for a methodology and a "view" in which stored documents can be indexed for rapid retrieval.

SUMMARY OF THE INVENTION

In general, the present invention provides a method, system and program product for providing high performance data lookup. Under the present invention, index keys are generated for a set of documents. This is typically accomplished by examining the set of documents, and connecting data values extracted from the set of documents to yield the index keys. Once the index keys are generated, an index view will be generated into which the index keys are populated. Using the index keys in the index view, an agent will automatically obtain the set of documents (i.e., in the background). Then, when a user requests one of the documents, the document will already have been retrieved from storage. As such, it can readily be provided to the user.

A first aspect of the present invention provides a method for providing high performance data lookup, comprising: extracting data values from each of a set of documents; creating index keys for the set of documents using the extracted data values; populating the index keys into an index view; and automatically obtaining the set of documents using the index keys in the index view.

A second aspect of the present invention provides a method for providing high performance data lookup, comprising: generating index keys for a set of documents; populating an index view with the index keys; automatically obtaining the set of documents using the index keys; receiving a request for a desired document; and retrieving the desired document from the obtained set of documents based on the request and the index keys.

A third aspect of the present invention provides a system for providing high performance data lookup, comprising: means for generating index keys for a set of documents; means for populating an index view with the index keys; means for automatically obtaining the set of documents using the index keys; means for receiving a request for a desired document; and means for retrieving the desired document from the obtained set of documents based on the request and the index keys.

A fourth aspect of the present invention provides a program product stored on a computer readable medium for providing high performance data lookup, the computer readable medium comprising program code for performing the following steps: generating index keys for a set of documents; populating an index view with the index keys; automatically obtaining the set of documents using the index keys; receiving a request for a desired document; and retrieving the desired document from the obtained set of documents based on the request and the index keys.

A fifth aspect of the present invention provides a method for deploying an application for providing high performance data lookup, comprising: providing a computer infrastructure being operable to: generate index keys for a set of documents; populate an index view with the index keys; automatically obtain the set of documents using the index keys; receive a request for a desired document; and retrieve the desired document from the obtained set of documents based on the request and the index keys.

A sixth aspect of the present invention provides computer software for deploying an application for providing high performance data lookup, the computer software comprising instructions for causing a computer system to perform the following functions: generate index keys for a set of documents; populate an index view with the index keys; automatically obtain the set of documents using the index keys; receive a request for a desired document; and retrieve the desired document from the obtained set of documents based on the request and the index keys.

A seventh aspect of the present invention provides a view for indexing documents, comprising: an index key portion for storing index keys for a set of documents, wherein each of the index keys includes a plurality of data values extracted from a corresponding one of the set of documents, and wherein the plurality of data values for the index keys are separated by a connector.

An eighth aspect of the invention provides a computer-readable medium that includes computer program code to enable a computer infrastructure to provide high performance data lookup.

A ninth aspect of the invention provides a business method for providing high performance data lookup.

The illustrative aspects of the present invention are designed to solve the problems herein described and other problems not discussed, which are discoverable by a skilled artisan.

BRIEF DESCRIPTION OF THE DRAWINGS

FIG. 3 shows an illustrative method flow diagram according to the present invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE DRAWINGS

As indicated above, the present invention provides a method, system and program product for providing high performance data lookup. Under the present invention, index keys are generated for a set of documents. This is typically accomplished by examining the set of documents, and connecting data values extracted from the set of documents to yield the index keys. Once the index keys are generated, an index view will be generated into which the index keys are populated. Using the index keys in the index view, an agent will automatically obtain the set of documents (i.e., in the background). Then, when a user requests one of the documents, the document will already have been retrieved from storage. As such, it can readily be provided to the user. It should be understood that as used herein, the term "document" is intended to refer to any collection of data that is store electronically.

Figure 1:
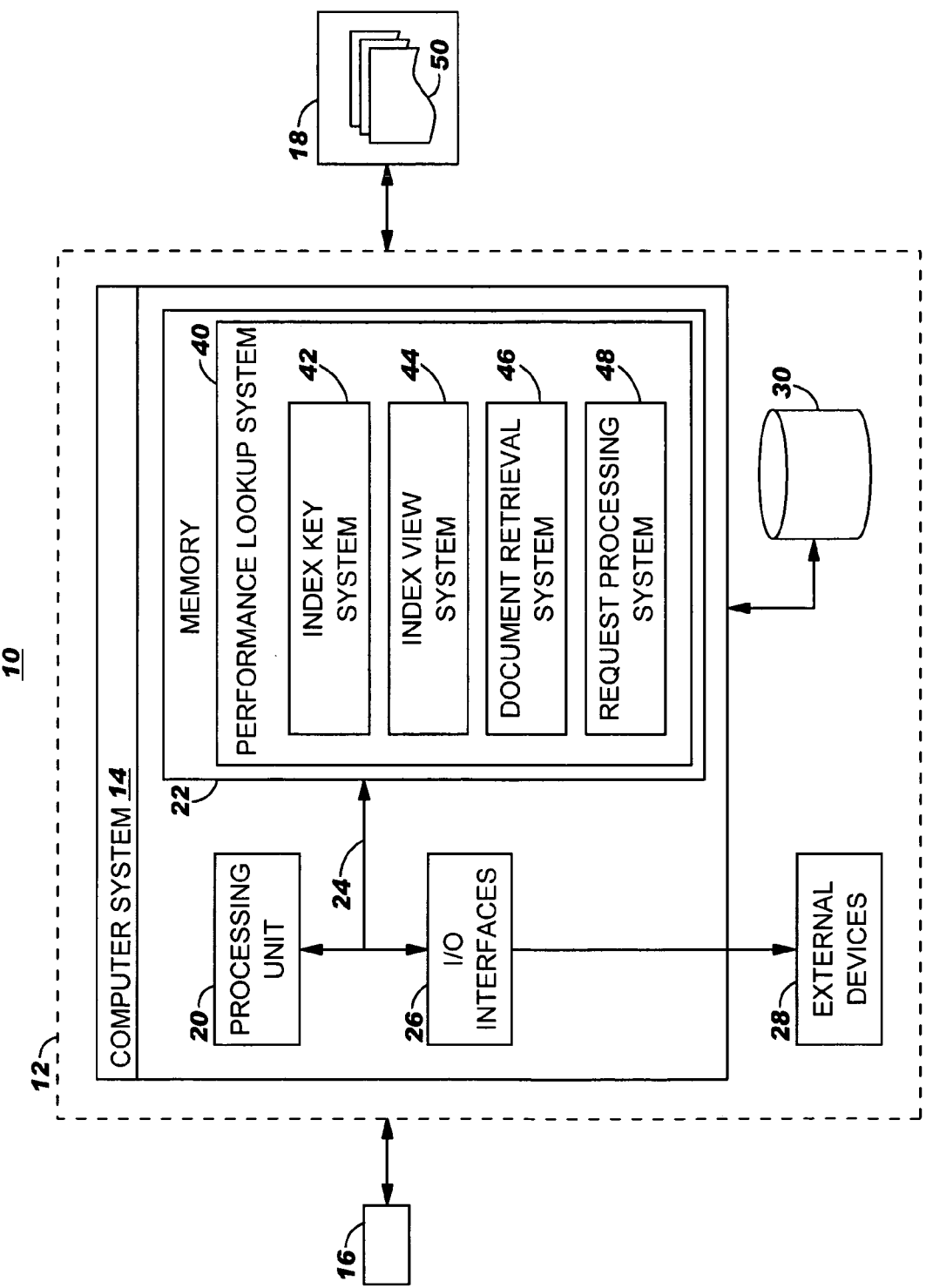
FIG. 1 shows an illustrative system for providing high performance data lookup according to the present invention.

Referring now to FIG. 1, a system 10 for providing high performance data lookup according to the present invention is shown. As depicted, system 10 includes a computer infrastructure 12, which comprises a computer system 14 that can perform the various process steps described herein. Computer system 14 is intended to represent any type of computer system capable of carrying out the teachings of the present invention. For example, computer system 14 could be a laptop computer, a desktop computer, a workstation, a handheld device, a server, etc. In addition, as will be further described below, computer system 14 can be deployed and/or operated by a service provider that is building providing high performance data lookup for users such as user 16. It should be appreciated that user 16 could directly access computer system 14 as shown, or could operate their own independent computer systems that communicate with computer system 14 over a network (e.g., the Internet, a wide area network (WAN), a local area network (LAN), a virtual private network (VPN), etc.). In the case of the latter, communications between computer system 14 and the user-operated computer system can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

In any event, assume that user 16 is authorized to access documents 50 as maintained by organization 18. Under the present invention, high performance data lookup of documents 50 is provided. To provide this functionality, performance lookup system 40 is shown implemented on computer system 14 as computer program code. To this extent, computer system 14 is shown including a processing unit 20, a memory 22, a bus 24, and input/output (I/O) interfaces 26. Further, computer system 14 is shown in communication with external I/O devices/resources 28 and one or more storage systems 30. In general, processing unit 20 executes computer program code, such as performance lookup system 40, that is stored in memory 22 and/or storage system(s) 30. While executing computer program code, processing unit 20 can read and/or write data, to/from memory 22, storage system(s) 30, and/or I/O interfaces 26. Bus 24 provides a communication link between each of the components in computer system 14. External devices 28 can comprise any devices (e.g., keyboard, pointing device, display, etc.) that enables a user to interact with computer system 14 and/or any devices (e.g., network card, modem, etc.) that enables computer system 14 to communicate with one or more other computing devices, such as those in organization 18 and/or operated by user 16.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, computer system 14 is only representative of various possible computer infrastructures that can include numerous combinations of hardware. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In addition, processing unit 20 may comprise a single processing unit, or be distributed across one or more processing units in one or more locations, e.g., on a client and server. Similarly, memory 22 and/or storage system 30 can comprise any combination of various types of data storage and/or transmission media that reside at one or more physical locations. Further, I/O interfaces 26 can comprise any system for exchanging information with one or more external devices 28. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 28 (e.g., a display) and/or storage system(s) 30 could be contained within computer system 14, not externally as shown.

Storage system 30 can be any type of system (e.g., a database) capable of providing storage for information under the present invention. To this extent, storage system 30 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into computer system 14. Moreover, although not shown for brevity purposes, and computer systems operated by user 16 will likely contain computerized components similar to computer system 14. It should also be understood that organization 18 and documents 50 could be contained within infrastructure 12. They are shown as independent systems for illustrative purposes only.

Shown in memory 22 of computer system 14 is performance lookup system 40, which includes index key system 42, index view system 44, document retrieval system 46 and request processing system 48. Operation of each of these systems is discussed further below. However, it is understood that some of the various systems shown in FIG. 1 can be implemented independently, combined, and/or stored in memory for one or more separate computers systems 14 that communicate over a network. Further, it is understood that some of the systems/functionality may not be implemented and/or additional systems/functionality may be included as part of the present invention. Still yet, it is understood that the depiction of these systems shown in FIG. 1 is illustrative only and that the same functionality could be achieved with a different configuration. That is, the functionality of these systems could be combined into fewer systems, or broken down into additional systems.

Under the present invention high performance lookup of documents 50 is provided. First, index key system 42 will create an index key for each document. To create the index keys, index key system 42 will analyze documents 50 and extract data values therefrom. These data values will be connected and separated by a separator to yield strings of data (with each string corresponding to a particular document). In addition, as will be shown below in conjunction with FIG. 2, the data values are positioned in the index keys in a descending hierarchical fashion.

Figure 2:
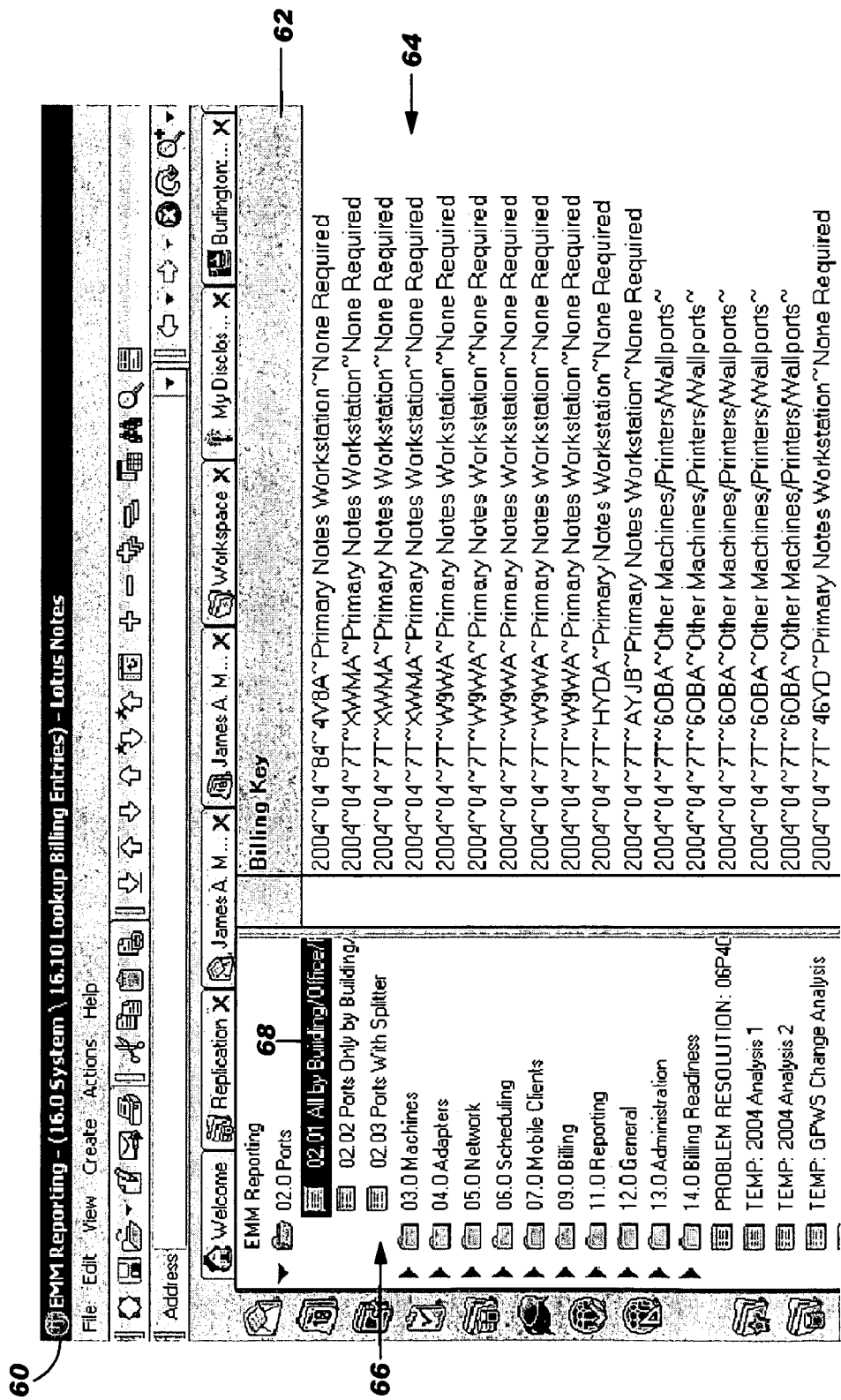
FIG. 2 shows an illustrative an index view according to the present invention.

Once the index keys have been generated, index view system 44 will generate an index view into which the index keys are populated. Referring now to FIG. 2, index view 60 is shown in greater detail. As depicted, index view 60 includes a key window 62 where index keys 64 are listed. The index keys 64 shown each include multiple data values as extracted from a corresponding document. In a typical embodiment, each index key 64 includes five or more data values. As further shown, each data value is separated from the next by a separator such as a tilde (~). In addition, as indicated above, the data values are arranged within each index key in a descending hierarchical fashion (e.g., year 2004 is first, month 04 is second, etc.). Document type window 66 allows a specific type of document 68 to be selected for display of its corresponding index keys in key window 62.

Referring back to FIG. 1, once index view 60 has been populated, document retrieval system 46 will automatically retrieve the documents using their index keys 64 (FIG. 2). Specifically, under the present invention, document retrieval system 46 includes an automated agent or the like that analyzes the index keys 64, and obtains the corresponding documents 50. At that point, the documents 50 can be considered "local" to computer system 14 (e.g., in memory 22 or storage system 30).

Then, if user 16 requests a certain document, user 16 will issue a request via a user view that is received by request processing system 48. Upon receipt, request processing system 48 will parse the request to determine what document is being requested, and then retrieve that document by cross-referencing the index key for that document. In one embodiment, request processing system can analyze the requests, and generate a user key for the requested document. The user key can resemble or be similar to the index key for that document. To this extent, request processing system 48 can be configured similar to index key system 42. A user key that is determined to be identical or sufficiently similar to an index key upon comparison could correspond to the requested document. Such document would then be retrieved (e.g., from local storage of computer system 14) and returned to or displayed to user 16.

Referring now to FIG. 3, a method flow diagram 100 according to the present invention is shown. First step S1 is to generate index keys for a set of documents. In general, this involves examining the set of documents, and connecting data values extracted from the set of documents to yield the index strings. Second step S2 is to populate an index view with the index keys. Thereafter, step S3 is to automatically obtain the set of documents using the index keys. Fourth step S4 is to receive a request for a desired document and fifth step S5 is to retrieve the desired document from the obtained set of documents based on the request and the index keys.

While shown and described herein as a method and system for providing high performance data lookup, it is understood that the invention further provides various alternative embodiments. For example, in one embodiment, the invention provides a computer-readable medium that includes computer program code to enable a computer infrastructure to provide high performance data lookup within organizations. To this extent, the computer-readable medium includes program code that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 30 (FIG. 1) (e.g., a fixed disk, a read-only memory, a random access memory, a cache memory, etc.).

In another embodiment, the invention provides a business method that performs the process steps of the invention on a subscription, advertising, and/or fee basis. That is, a service provider, such as an Internet Service Provider, could offer to provide high performance data lookup as described above. In this case, the service provider can create, maintain, support, etc., a computer infrastructure, such as computer infrastructure 12 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a method of providing high performance data lookup. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for providing high performance data lookup, comprising:
   extracting data values from each of a set of documents;
   creating index keys for the set of documents using the extracted data values;
   populating the index keys into an index view; and
   automatically obtaining the set of documents using the index keys in the index view prior to a request for a desired document from a user.

2. The method of claim 1 wherein the index keys comprise the extracted data values arranged in a descending hierarchical fashion.

3. The method of claim 1, wherein each of the index keys comprises a plurality of data values extracted from a corresponding one of the set of documents.

4. The method of claim 1, wherein the obtaining step comprises an automated agent obtaining the set of documents using the index keys in the index view.

5. The method of claim 1, wherein the request is issued via a user view.

6. The method of claim 1, wherein the set of documents are stored in at least one database, and wherein the retrieving step comprises retrieving the set of documents from the at least one database using the index keys.

7. A method for providing high performance data lookup, comprising:
   generating index keys for a set of documents;
   populating an index view with the index keys;
   automatically obtaining the set of documents using the index keys prior to a request for a desired document from a user;
   receiving the request for the desired document; and
   retrieving the desired document from the obtained set of documents based on the request and the index keys.

8. The method of claim 7, wherein step of generating the index keys comprises:
   examining the set of documents; and
   connecting data values extracted from the set of documents to yield the index strings, wherein each of the index keys comprises a plurality of data values obtained from a corresponding one of the set of documents.

9. The method of claim 8, wherein the plurality of data values comprises at least five data values.

10. The method of claim 7, wherein the obtaining step is performed by an automated agent.

11. The method of claim 7, wherein the request is made by the user via a user view.

12. The method of claim 7, further comprising:
    generating the user key based on the request; and
    comparing the user key to the index keys to identify the desired document among the obtained set of documents.

13. A method for deploying an application for providing high performance data lookup, comprising:
    providing a physical computer infrastructure being operable to:
        generate index keys for a set of documents;
        populate an index view with the index keys;
        automatically obtain the set of documents using the index keys prior to a request for a desired document from a user;
        receive the request for the desired document; and
        retrieve the desired document from the obtained set of documents based on the request and the index keys.

* * * * *